United States Patent

Loeffler et al.

[11] Patent Number: 5,223,607
[45] Date of Patent: Jun. 29, 1993

[54] REACTIVE AZO DYES WITH AT LEST TWO REACTIVE HALOTRIAZINE GROUPS

[75] Inventors: Hermann Loeffler, Speyer; Manfred Patsch, Wachenheim; Reinhold Krallmann, Weisenheim, all of Fed. Rep. of Germany

[73] Assignee: BASF Aktiengesellschaft, Ludwigshafen, Fed. Rep. of Germany

[21] Appl. No.: 717,048

[22] Filed: Jun. 18, 1991

[30] Foreign Application Priority Data

Jun. 29, 1990 [DE] Fed. Rep. of Germany ....... 4020769

[51] Int. Cl.⁵ ............ C09B 62/01; C09B 62/09; D06P 1/382; D06P 3/10
[52] U.S. Cl. ................. 534/634; 534/617; 534/632
[58] Field of Search ......... 534/617, 632, 634

[56] References Cited

U.S. PATENT DOCUMENTS 4,988,802  1/1991  Loeffler et al. .............. 534/634

FOREIGN PATENT DOCUMENTS

| 20387589 | 9/1990 | European Pat. Off. ....... 534/637 |
| 52-40686 | 3/1977 | Japan ................... 534/634 |
| 53-27628 | 3/1978 | Japan ................... 534/634 |
| 53-111176 | 9/1978 | Japan ................... 534/634 |
| 60-69163 | 4/1985 | Japan ................... 534/634 |
| 1583387 | 1/1981 | United Kingdom .......... 534/634 |

OTHER PUBLICATIONS

Journal of the Society of Dyers and Colourists, vol. 104, pp. 405-452, Nov. 1988; "Dye-Fibre Bond Stabilities of Dyeings of Bifunctional Reactive Dyes Containing a Monochlorotriazine and A . . . " Matsui.

Primary Examiner—Floyd D. Higel
Attorney, Agent, or Firm—Oblon, Spivak, McClelland, Maier & Neustadt

[57] ABSTRACT

Reactive azo dyes useful for dyeing and printing hydroxyl- or nitrogen-containing substrates have the formula

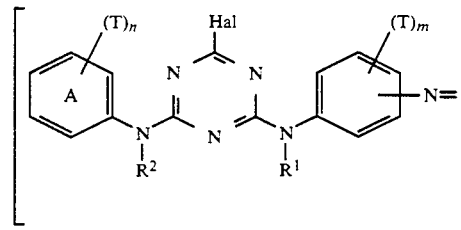

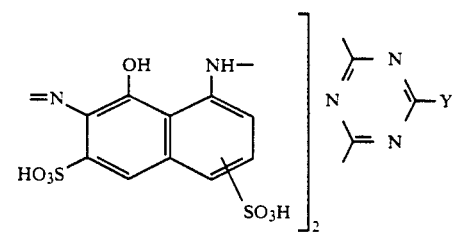

where
m is 0, 1 or 2,
n is 1 or 2,
$R^1$ and $R^2$ are hydrogen or substituted or unsubstituted $C_1-C_4$-alkyl,
T is carboxyl or hydroxysulfonyl,
Hal is fluorine or chlorine,
Y is fluorine, chlorine or the radical $NR^1R^2$, $OR^1$ or $SR^1$, where $R^1$ and $R^2$ are each as defined above, and the ring A may be benzofused and/or substituted, with the proviso that a) the sum total of acidic groups is at least 8 and that b) when the structural element of the formula

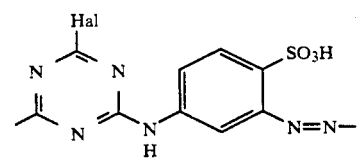

is present and Y is fluorine or chlorine and T is hydroxysulfonyl, the sum total of hydroxysulfonyl radicals is at least 10.

4 Claims, No Drawings

REACTIVE AZO DYES WITH AT LEST TWO REACTIVE HALOTRIAZINE GROUPS

The present invention relates to novel reactive azo dyes of the formula I

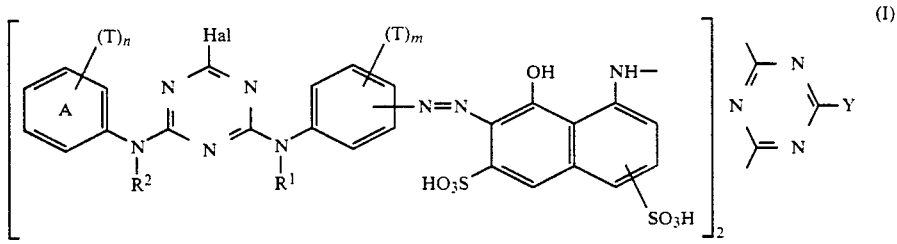

where
m is 0, 1 or 2,
n is 1 or 2,
$R^1$ and $R^2$ are identical or different and each is independently of the other hydrogen or $C_1$-$C_4$-alkyl which may be substituted by hydroxyl, $C_1$-$C_4$-alkoxy, halogen, cyano, carboxyl or hydroxysulfonyl,
T, appearances of which are identical or different, is carboxyl or hydroxysulfonyl,
Hal is fluorine or chlorine,
Y is fluorine, chlorine or the radical $NR^1R^2$, $OR^1$ or $SR^1$, where $R^1$ and $R^2$ are each as defined above, and the ring A may be benzofused or substituted by $C_1$-$C_4$-alkyl, $C_1$-$C_4$-alkoxy or halogen,
with the proviso that
a) the sum total of the hydroxysulfonyl radicals or of the hydroxysulfonyl and carboxyl radicals together is not less than 8 and that
b) when the structural element of the formula

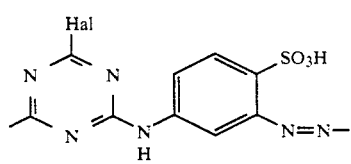

is present, Y is fluorine or chlorine and T is hydroxysulfonyl, the sum total of the hydroxysulfonyl radicals is not less than 10,
and to the use of the novel dyes for dyeing or printing hydroxyl- or nitrogen-containing substrates.

The novel reactive azo dyes of the formula I are shown in the form of the free acids, although, of course, their salts, in particular their alkali metal salts, also form part of the claimed subject-matter.

JP-A-69 163/1985 describes reactive dyes which differ from those of the formula I in that their ring A has neither a hydroxysulfonyl group nor a carboxyl group but an additional reactive group based on vinylsulfonyl.

It has been found that these dyes still have application defects. For instance, their lack of resistance to alkaline and/or peroxide-containing detergents is poor, or their color yield at the customary dyeing temperature is too low (see J. Soc. Dyers Colour. 104 (1988), 425-31).

Earlier EP-A-387 589 concerns similar reactive azo dyes, but they differ in the number of hydroxysulfonyl groups.

It is an object of the present invention to provide novel reactive azo dyes which have advantageous properties, in particular a high yield of fixation and high wet fastness properties. The novel dyes shall also be able to be applied both cold and hot.

We have found that this object is achieved by the reactive azo dyes of the formula I defined in more detail at the beginning.

Any alkyl appearing in the abovementioned formula I may be either straight-chain or branched.

$R^1$ and $R^2$ are each for example methyl, ethyl, propyl, isopropyl, butyl, isobutyl, sec-butyl, 2-hydroxyethyl, 2- or 3-hydroxypropyl, 2- or 4-hydroxybutyl, 2-methoxyethyl, 2- or 3-methoxypropyl, 2- or 4-methoxybutyl, 2-ethoxyethyl, 2- or 3-ethoxypropyl, 2- or 4-ethoxybutyl, 2-chloroethyl, 2- or 3-chloropropyl, 2- or 4-chlorobutyl, 2-cyanoethyl, 3-cyanopropyl, 4-cyanobutyl, 2-hydroxysulfonylethyl, 3-hydroxysulfonylpropyl, 4-hydroxysulfonylbutyl, 2-carboxyethyl, 3-carboxypropyl or 4-carboxybutyl.

Suitable diazo components from which to derive the radical

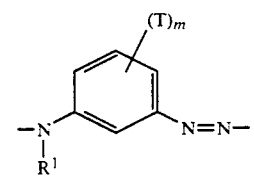

are for example 1,3-diaminobenzene, 2,4-diaminobenzenesulfonic acid, 2,5-diaminobenzenesulfonic acid, 2,4-diaminobenzoic acid, 2,4-diaminobenzene-1,5-disulfonic acid and 2,5-diaminobenzene-1,4-disulfonic acid.

Radicals of the coupling component of the formula

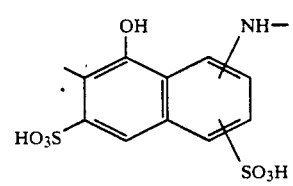

are for example

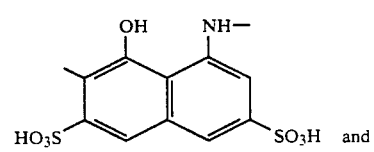 and

-continued

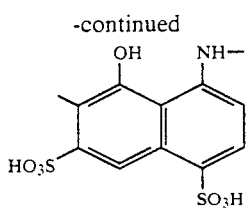

The radicals

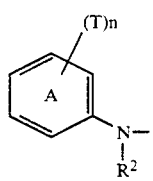

are derived for example from aniline-2,4-disulfonic acid, N-methylaniline- or N-ethylaniline-2,4-disulfonic acid, aniline-2,5-disulfonic acid, N-methylaniline- or N-ethylaniline-2,5-disulfonic acid, 2-amino-4-hydroxysulfonylbenzoic acid, 2-amino-5-hydroxysulfonylbenzoic acid, 2-methylamino- or 2-ethylamino-5-hydroxysulfonylbenzoic acid, 4-chloroaniline-2,5-disulfonic acid, 3-chloroaniline-4,6-disulfonic acid, 2-chloroaniline-4,5-disulfonic acid, 4-aminotoluene-2,5-disulfonic acid, 3-aminophthalic acid, 4-aminophthalic acid, aminoterephthalic acid, 1-aminonaphthalene-3,6- or -3,8-disulfonic acid, 1-aminonaphthalene-4,7-disulfonic acid or 2-aminonaphthalene-1,5-, -3,6- or -6,8-disulfonic acid.

Emphasis must be given to reactive azo dyes of the formula I in which the radical

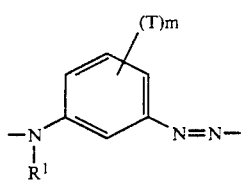

is derived from the following diazo components: 2,4-diaminobenzenesulfonic acid, 2,5-diaminobenzenesulfonic acid and 2,4-diaminobenzene-1,5-disulfonic acid.

Emphasis must further be given to reactive azo dyes of the formula I in which the ring A is not benzofused and n is 2.

Emphasis must further be given to reactive azo dyes of the formula I in which the coupling component radicals have independently of each other the formula

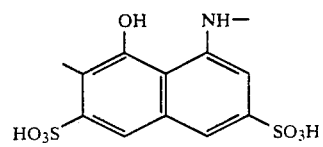

or in particular

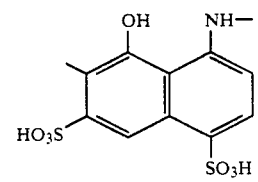

Emphasis must further be given to reactive azo dyes of the formula I in which the sum total of the hydroxysulfonyl radicals or of the hydroxysulfonyl and carboxyl radicals together is 10.

The azo reactive dyes of the formula I according to the present invention may also take the form of mixtures, in which case suitable mixtures are in particular those where the coupling components are 1-amino-8-hydroxynaphthalene-3,6- and -4,6-disulfonic acid. These mixtures can be prepared by mechanical mixing or by mixed coupling. In either case the mixing ratio is freely choosable.

Of particular interest are reactive azo dyes which conform to the formula Ia

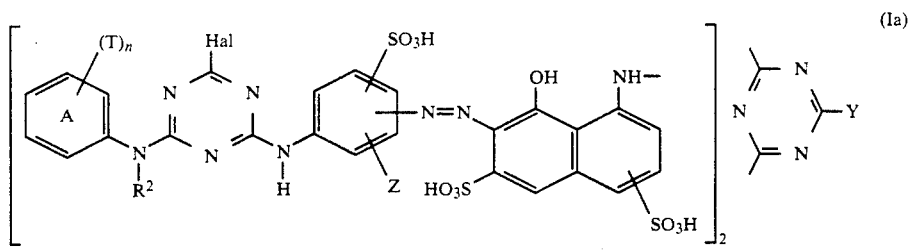

where
R² is hydrogen or methyl,
Z is hydrogen or hydroxysulfonyl, and
n, T, Hal, Y and the ring A are each as defined above.
Also of special interest are reactive azo dyes which conform to the formula Ib

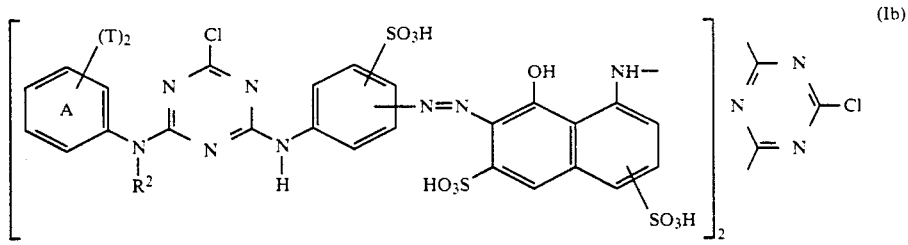

where
R² is hydrogen or methyl and
T is as defined above.

The novel reactive azo dyes of the formula I are prepared in a conventional manner. For example, by diazotizing a) an amine of the formula II

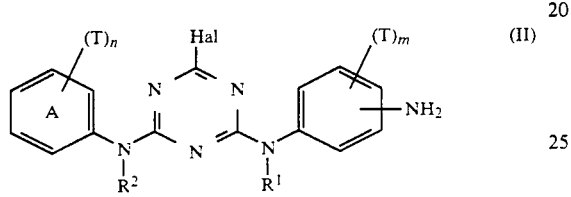

where m, n, Hal, T, R¹, R² and the ring A are each as defined above, and coupling the diazonium salt to a coupling component of the formula III (III)

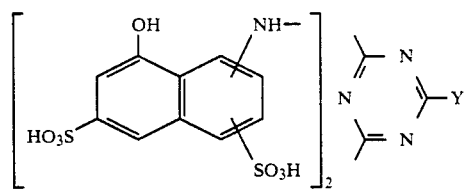

where Y is as defined above.

A further method comprises for example diazotizing
b) an amine of the formula IV

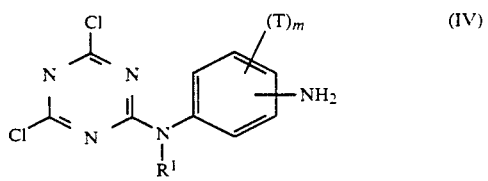

where m, R¹ and T are each as defined above, coupling to a coupling component III and then reacting with an aniline derivative of the formula V

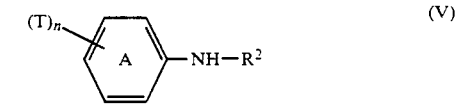

where n, R², T and the ring A are each as defined above.

A further method comprises for example reacting
c) the dye of the formula VI (VI)

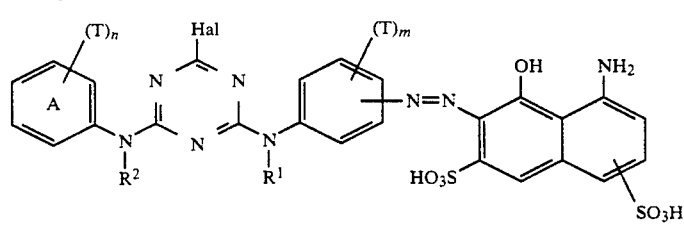

where m, n, Hal, R¹, R², T and the ring A are each as defined above, with a further dye of the formula VII where m, n, Hal, R¹, R², T and the ring A are each as defined above.

If asymmetrical reactive azo dyes of the formula I are to be prepared, it is advisable to adopt method a) or method c). For instance, in case a) it is possible to use a coupling component of the formula III where two different aminonaphtholsulfonic acids are attached to the triazine ring. With c) it is possible for example to use a dye VII containing an aminonaphtholsulfonic acid which is different from that contained in the dye of the formula VI.

A further method for obtaining asymmetrical dyes consists in reacting a dye of the formula VI with an appropriate coupling component (for example 1-amino-8-hydroxynaphthalene-3,6- or -4,6-disulfonic acid) and coupling with the diazonium salt of an amine of the formula II, said amine of the formula II either being identical to the amine underlying the dye VI or else being different therefrom. In this way it is possible to arrive at asymmetrical dyes which differ not only in the amine moiety but also in the coupling component moiety.

Preferably, the dyes according to the present invention are prepared by method a).

The novel reactive dyes of the formula I are usable with advantage for dyeing or printing hydroxyl- or nitrogen-containing organic substrates. Such substrates are for example leather or fiber material which contains predominantly natural or synthetic polyamides or natural or regenerated cellulose. The novel dyes are preferably usable for dyeing or printing textile material based on cotton.

Used for this purpose, they are noteworthy for a low fixation temperature in the exhaust method and for a short fixation time at room temperature in the cold pad-batch method. Moreover, the poor wash fastness properties of the addition mechanism reactive dyes which are otherwise necessary for such fixation conditions are avoided. The color strength, the fixation yield and the light fastness of the novel dyes are very high.

The following Examples will explain the invention in more detail:

EXAMPLE 1 a) A solution of 0.5 mol of 1-amino-8-naphthol-4,6-disulfonic acid in 400 ml of water and 30 ml of 50% strength by weight sodium hydroxide solution was added to an intensively stirred mixture of 96.0 g of cyanuric chloride, 500 ml of ice-water and 2 ml of 30% strength by weight hydrochloric acid, and the resulting mixture was stirred at from 5° to 8° C. for three hours until the aminonaphthalene had been completely dissolved and acylated. To this solution was then added a further solution of the sodium salt of 1-amino-8-naphthol-4,6-disulfonic acid in the above amount and concentration, and the pH was raised to 5 with 105 g of sodium bicarbonate, sprinkled in, while the mixture was warmed to 20°–25° C. After three hours, stirring under these conditions and after dilution with 1,000 ml of water, the condensation had ended. The precipitation of the 2,6-[bis(8-hydroxy-4,6-dihydroxysulfonylnaphth-1-yl-amino]-4-chloro-s-triazine formed was completed with 700 g of sodium chloride. The product was then filtered off with suction and washed with 20% strength by weight sodium chloride solution. The yield of crude product was 95%.

b) 0.05 mol of 2-(2,4-dihydroxysulfonylphenylamino)-4-chloro-6-(3-amino-4-hydroxysulfonylphenylamino)-s-triazine was dissolved in 300 ml of ice-water and diazotized with 15 ml of 3.33 N sodium nitrite solution and 17 ml of 30% strength by weight hydrochloric acid. After stirring for one hour with ice cooling, the excess nitric acid was destroyed with sulfamic acid and the dispersion of the diazonium salt was mixed with the suspension of 0.024 mol of the binary coupling component of a) in 150 ml of water. The coupling reaction was effected by adding 100 ml of saturated sodium acetate solution and sodium bicarbonate up to pH 6 and stirring at room temperature overnight. The completely dissolved dye of the formula

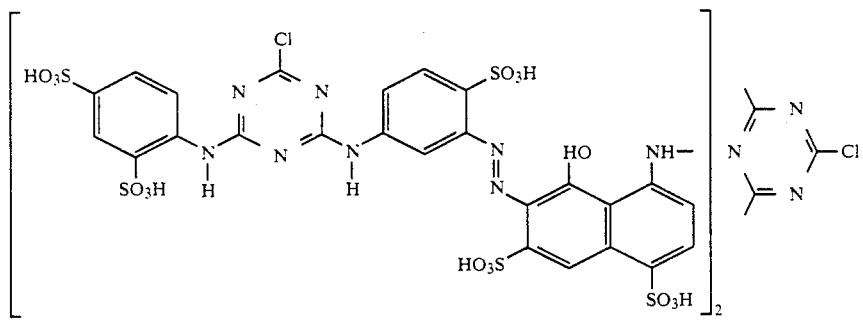

($\lambda_{max}$ (water): 535 nm)

was precipitated with 100 g of potassium chloride in the form of the decapotassium salt and filtered off. It was washed with 5% strength by weight potassium chloride solution and then with 70% strength by volume aqueous acetone. Drying took place at room temperature under reduced pressure. The dye thus obtained, on application to cellulose materials from an alkaline bath at room temperature with an 8-hour fixing time by the cold pad-batch process or else at 60° C. by the exhaust process produces, a medium red shade with a high fixation yield and color strength which has very good light and wet fastness properties.

EXAMPLE 2

Example 1 was repeated using 2-(2,5-dihydroxysulfonylphenylamino)-4-chloro-6-(4-amino-3-hydroxysulfonylphenylamino)-s-triazine and the coupling component of Example 1a) to obtain the violet dye of the formula

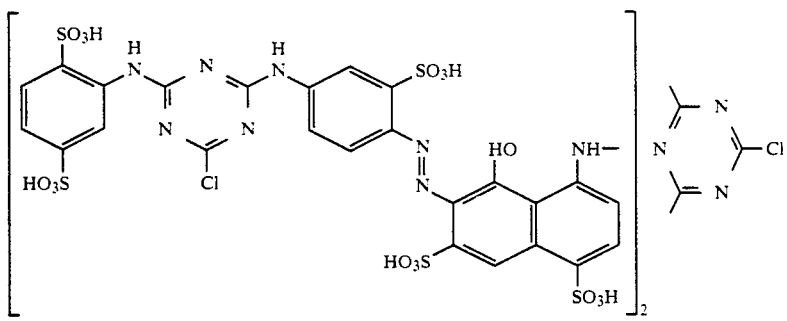

($\lambda_{max}$ (water): 542.1 nm)
in the form of the decapotassium salt, which in respect of dyeing conditions, color strength and fastness properties is similar to the dye of Example 1.

The dyes of the formula

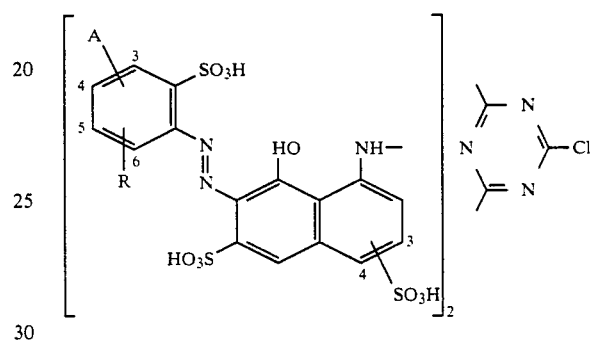

listed below in Table 1 are obtained in a similar manner and have similar properties.

TABLE 1

| Example No. | A | R | 3-/4-SO$_3$H | Hue $\lambda_{max}$ [nm] in water |
|---|---|---|---|---|
| 3 | 5- [SO$_3$H, HO$_3$S phenyl-NH-C(=N-triazine-Cl)] | H | 4 | red 535.1 |
| 4 | 5- [SO$_3$H, HO$_3$S phenyl-NH-C(=N-triazine-Cl)] | H | 3 | bluish red 536.1 |
| 5 | 4- [HO$_3$S, HO$_3$S phenyl-NH-C(=N-triazine-Cl)] | H | 4 | violet 538 |
| 6 | 5- [SO$_3$H, HOOC phenyl-NH-C(=N-triazine-F)] | H | 4 | red 535 |

TABLE 1-continued
| Example No. | A | R | 3-/4-SO₃H | Hue λ$_{max}$ [nm] in water |
|---|---|---|---|---|
| 7 | 5- 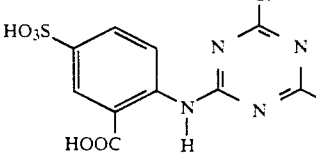 | H | 4 | red 533.1 |
| 8 | 4- 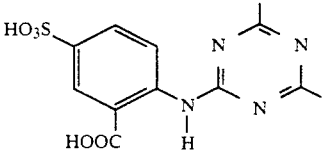 | H | 4 | violet 540.1 |
| 9 | 5- 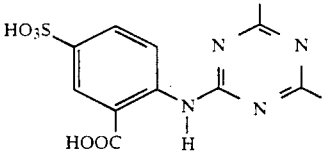 | H | 3 | bluish red 535 |
| 10 | 5- 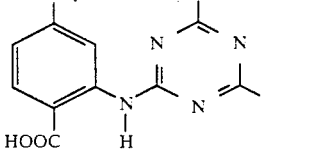 | H | 4 | red 535.1 |
| 11 | 5- 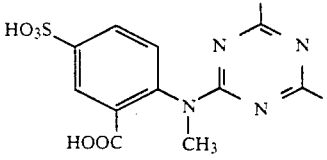 | H | 4 | red 510 |
| 12 | 4- 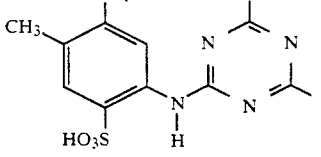 | H | 4 | red 536.1 |
| 13 | 4- 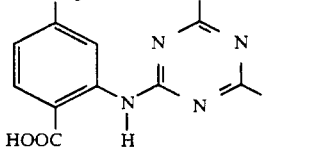 | H | 4 | violet 542 |
| 14 | 5- 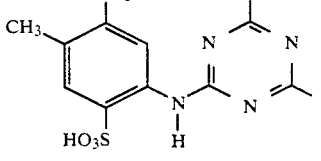 | H | 4 | red 536 |

TABLE 1-continued

| Example No. | A | R | 3-/4-SO₃H | Hue λ$_{max}$ [nm] in water |
|---|---|---|---|---|
| 15 | 5- (chlorobenzene with SO₃H, HO₃S, Cl substituents linked via NH to chlorotriazine) | H | 4 | red 535 |
| 16 | 4- (chlorobenzene with SO₃H, HO₃S, Cl substituents linked via NH to chlorotriazine) | H | 4 | violet 538 |
| 17 | 5- (benzene with SO₃H, HO₃S, Cl substituents linked via NH to chlorotriazine) | H | 4 | red 535 |
| 18 | 4- (benzene with SO₃H, HO₃S, Cl substituents linked via NH to chlorotriazine) | H | 4 | violet 538 |
| 19 | 5- (benzene with SO₃H, HO₃S, CH₃ substituents linked via NH to chlorotriazine) | 4-SO₃H | 4 | red 534 |
| 20 | 5- (naphthalene with HO₃S, HO₃S substituents linked via NH to chlorotriazine) | H | 4 | red 533 |
| 21 | 5- (naphthalene with SO₃H, HO₃S substituents linked via NH to chlorotriazine) | H | 4 | red 536 |
| 22 | 5- (naphthalene with SO₃H, HO₃S substituents linked via NH to chlorotriazine) | 4-SO₃H | 4 | red 534 |

TABLE 1-continued

| Example No. | A | R | 3-/4-SO₃H | Hue λ$_{max}$ [nm] in water |
|---|---|---|---|---|
| 23 | 4- (phenyl with HO₃S, HO₃S substituents, N(CH₃) linked to chlorotriazine) | H | 4 | violet 515 |
| 24 | 5- (phenyl with SO₃H, Cl, HOOC substituents, NH linked to chlorotriazine) | H | 4 | red 535 |
| 25 | 4- (phenyl with SO₃H, Cl, HOOC substituents, NH linked to chlorotriazine) | H | 4 | violet 514 |

Example 1a was completed using one equivalent each of 1-amino-8-naphthol-3,6-disulfonic acid and cyanuric chloride and a further equivalent of 1-amino-8-naphthol-4,6-disulfonic acid to obtain a mixed-substituted 2,6-diamino-4-chloro-s-triazine. The hues of the dyes obtained with the diazo components of the previous Examples and this coupling component are between those of the symmetrical dyes described above. For instance, the hue of the dye of Example 24 is between that of the dyes of Examples 1 and 3, the difference being hardly visible, if at all. The fixing conditions, fixation yields and wet fastness properties are similar to those of the previous Examples.

The dyes listed below in Table 2 conform to the formula

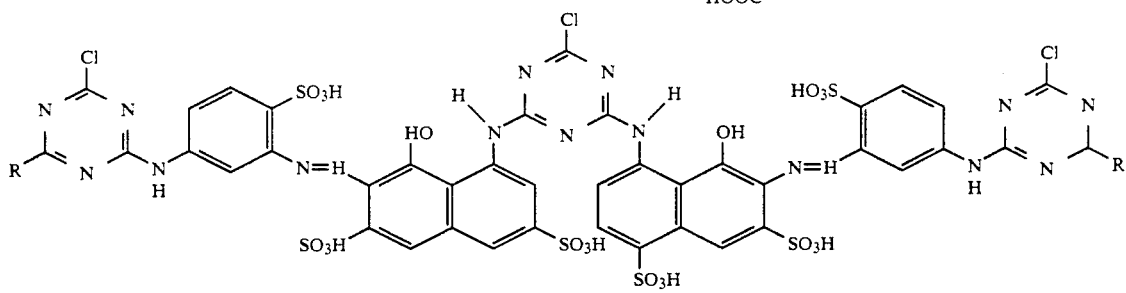

TABLE 2

| Example No. | R | λ$_{max}$ [nm] in water |
|---|---|---|
| 26 | (phenyl with SO₃H, HO₃S, NH-) | 535 |
| 27 | (phenyl with HO₃S, HO₃S, NH-) | 535 |
| 28 | (phenyl with SO₃H, HOOC, NH-) | 535 |
| 29 | (phenyl with HO₃S, HOOC, NH-) | 535 |

TABLE 2-continued

| Example No. | R | λ_max [nm] in water |
|---|---|---|
| 30 | [structure: benzene with CH₃, SO₃H, HO₃S, NH–] | 535 |
| 31 | [structure: benzene with Cl, SO₃H, HO₃S, NH–] | 535 |
| 32 | [structure: benzene with HO₃S, SO₃H, Cl, NH–] | 535 |
| 33 | [naphthalene with HO₃S, SO₃H, NH–] | 535 |

EXAMPLE 34 a) 0.25 mol of the binary coupling component of Example 1a was stirred in 1,000 ml of water and 100 g (0.952 mol) of diethanolamine at 70° C. for 8 hours and filtered. Acetone was added to the filtrate at pH 3.5 to bring down a precipitate, which was isolated. The colorless product obtained contained only ionic chlorine (purity: 87%—HPLC).

b) 0.024 mol of this compound was combined with 0.05 mol of diazotized 2-(2,4-dihydroxysulfonyl-phenylamino)-4-chloro-6-(3-amino-4-hydroxysulfonyl-phenylamino)-s-triazine, by coupling as described in Example 1b, to produce the dye of the formula

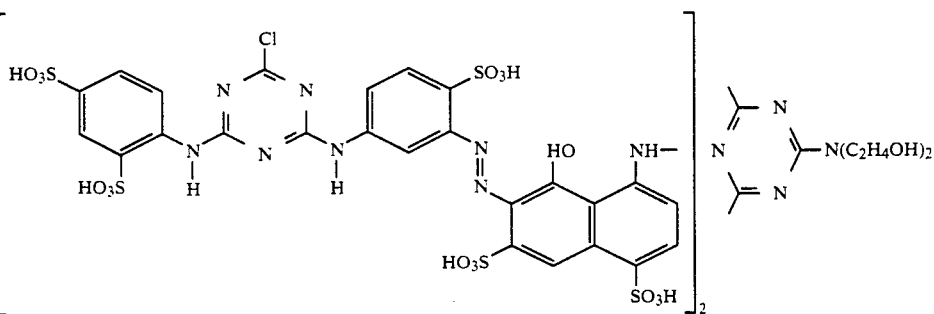

($\lambda_{max}$ (water): 510 nm)

which dyes cotton material in a red shade not only at room temperature by the cold pad-batch process but also at 60° C.

EXAMPLE 35 a) 0.1 mol of the coupling component of Example 1a was hydrolyzed by stirring in 300 ml of water and 40 ml of 30% strength by weight hydrochloric acid at 40°-50° C. for 4 hours. It was filtered off with suction while cooling with ice and washed with 90% strength by volume aqueous acetone.

b) 0.024 mol of the moist product thus obtained was suspended in 200 ml of water and coupled to the diazonium salt of Example 1b to give the red dye of the formula

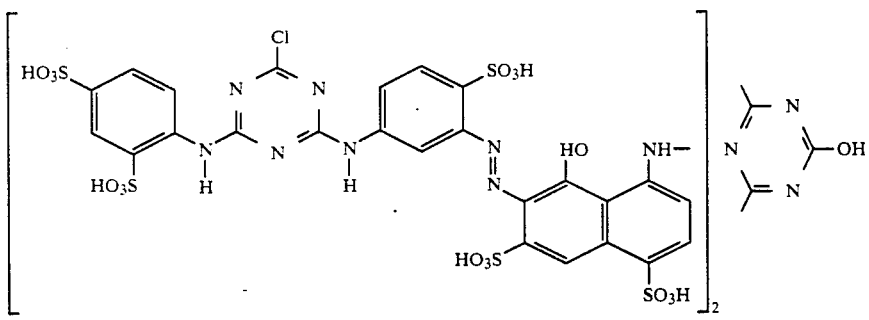

which can likewise be applied under the dyeing conditions mentioned in Example 40 ($\lambda_{max}$: 533 nm).

EXAMPLE 36 a) 0.05 mol of the binary coupling component of Example 1a was stirred in 100 ml of methanol, 30 ml of 30% strength by weight methanolic sodium methoxide solution and 50 ml of dimethyl sulfoxide at room temperature overnight. 250 ml of acetone were added, and the precipitate was filtered off with suction to isolate the methoxytriazinyl compound.

b) Combined with the diazonium salt of Example 1b under similar conditions it produced the dye of the formula

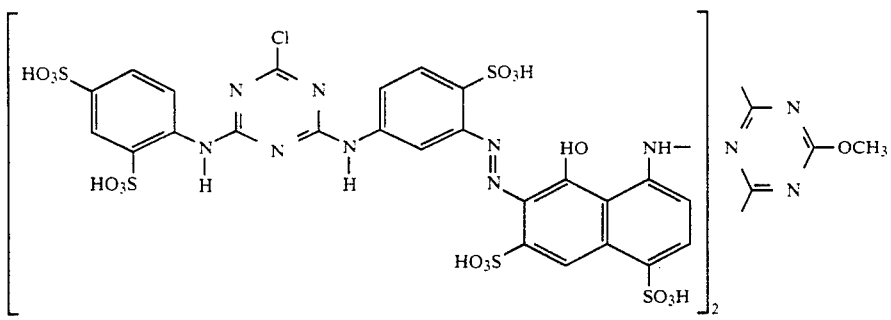

($\lambda_{max}$: 532 nm) which can likewise be applied by the cold pad-batch process in high yield of fixation.

EXAMPLES 37 AND 38

Example 32 was repeated to obtain the dyes of the formula

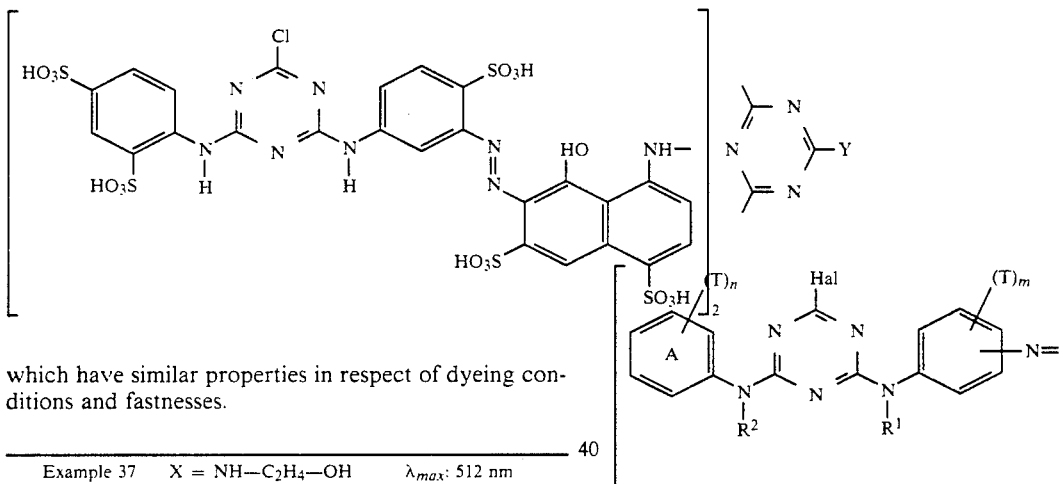

which have similar properties in respect of dyeing conditions and fastnesses.

| Example 37 | X = NH—C$_2$H$_4$—OH | $\lambda_{max}$: 512 nm |
| Example 38 | X = NH—C$_2$H$_4$—SO$_3$H | $\lambda_{max}$: 512 nm |

EXAMPLE 39

100 g of a cotton yarn were treated in a dyebath containing 1,500 ml of water, 2.0 g of the dye of Example 2, 75 g of sodium sulfate and 30 g of sodium carbonate. Starting at 30° C., the temperature was raised to 60° C. in the course of 30 minutes and kept at 60° C. for 60 minutes.

Conventional finishing by rinsing and soaping off at the boil left a dyeing having a bright reddish violet shade with excellent fastness properties.

EXAMPLE 40

A cotton fabric was padded on a three-roll pad-mangle at room temperature with a dyeing liquor containing per 1,000 g 16 g of the dye of Example 1, 100 g of sodium silicate (38° Bé), 50 g of sodium hydroxide solution (38° Bé) and 100 g of urea.

After impregnating to a wet pickup of 70%, the fabric was batched up and stored wrapped in a film in the moist state at room temperature for 8 hours.

Conventional finishing by rinsing and soaping off at the boil left a deep dyeing having a brilliant red shade and very good fastness properties.

We claim:

1. A reactive azo dye of the formula

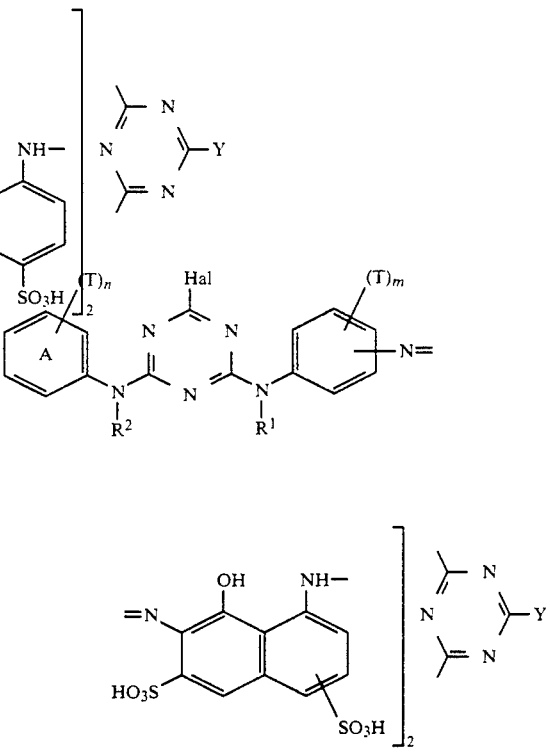

wherein
m is 0, 1 or 2,
n is 1 or 2,
R$^1$ and R$^2$ are identical or different and each is independently of the other hydrogen or C$_1$-C$_4$-alkyl, hydroxyl substituted C$_1$-C$_4$-alkyl, C$_1$-C$_4$-alkoxy substituted C$_1$-C$_4$-alkyl, halogen substituted C$_1$-C$_4$-alkyl, cyano substituted C$_1$-C$_4$-alkyl, carboxyl substituted C$_1$-C$_4$-alkyl or hydroxysulfonyl substituted C$_1$-C$_4$-alkoxy,
T, are identical or different, is carboxyl or hydroxysulfonyl,
Hal is fluorine or chlorine,
Y is fluorine, chlorine or the radical NR$^1$R$^2$, OR$^1$ or SR$^1$, where R$^1$ and R$^2$ are each as defined above and the ring A is benzofused, is not benzofused or substituted by $C_1$-$C_4$-alkyl, $C_1$-$C_4$-alkoxy or halogen, with the proviso that
a) the number of hydroxysulfonyl radicals or of the hydroxysulfonyl and carboxyl radicals together is not less than 8 and that
b) when the structural element of the formula

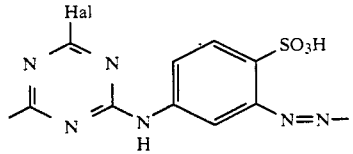

is present, Y is fluorine or chlorine and T is hydroxysulfonyl, and the number of the hydroxysulfonyl radicals is not less than 10.

2. The reactive azo dye of claim 1 of the formula

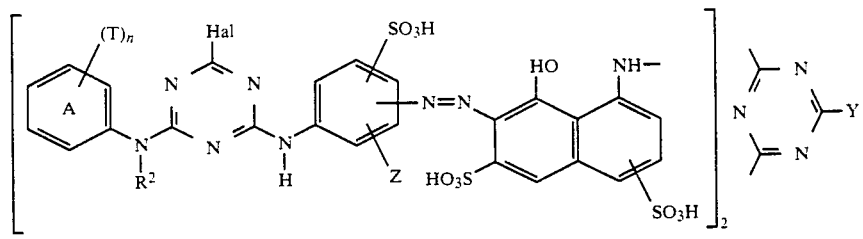

where
R² is hydrogen or methyl,
Z is hydrogen or hydroxysulfonyl, and
n, T, Hal, Y and the ring A are each as defined in claim 1.

3. The reactive azo dye of claim 1 of the formula

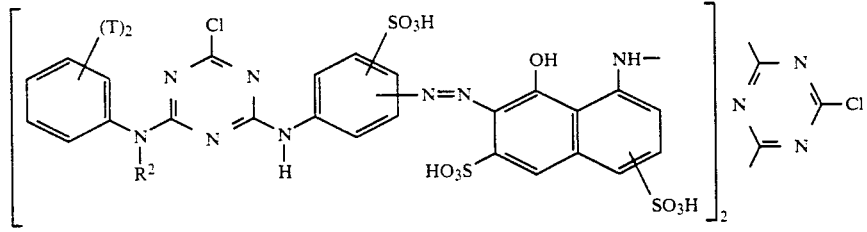

where
R² is hydrogen or methyl and
T is as defined in claim 1.

4. A method of using a reactive azo dye as claimed in claim 1 for dyeing or printing hydroxyl- or nitrogen-containing substrates.

* * * * *

UNITED STATES PATENT AND TRADEMARK OFFICE
CERTIFICATE OF CORRECTION

PATENT NO. :  5,223,607
DATED      :  June 29, 1993
INVENTOR(S):  Hermann Loeffler et al.

It is certified that error appears in the above-indentified patent and that said Letters Patent is hereby corrected as shown below:

Title page, item [54] and col. 1, lines 1-2,

The title is incorrect, should read: --REACTIVE AZO DYES WITH AT LEAST TWO REACTIVE HALOTRIAZINE GROUPS--

Signed and Sealed this

Eighth Day of February, 1994

Attest:

BRUCE LEHMAN

Attesting Officer

Commissioner of Patents and Trademarks